United States Patent [19]
Schmidt

[11] Patent Number: 5,136,196
[45] Date of Patent: Aug. 4, 1992

[54] UMBILICAL RELEASE MECHANISM

[75] Inventor: Thomas D. Schmidt, Berwyn, Pa.

[73] Assignee: Megamation Incorporated, Lawrenceville, N.J.

[21] Appl. No.: 710,058

[22] Filed: Jun. 4, 1991

[51] Int. Cl.$^5$ .............................. H02K 11/00
[52] U.S. Cl. ........................ 310/71; 310/12; 439/449; 439/470; 318/135
[58] Field of Search ............... 310/71, 12, 13; 318/135; 439/449, 470, 471, 472, 473, 451, 452, 516, 475

[56] References Cited

U.S. PATENT DOCUMENTS

| | | | |
|---|---|---|---|
| 4,351,579 | 9/1982 | Kordes et al. | 439/449 |
| 4,538,875 | 9/1985 | Krenz | 439/470 |
| 4,867,595 | 9/1989 | Hoffman | 403/13 |
| 4,989,903 | 2/1991 | McAllister | 285/114 |

Primary Examiner—R. Skudy
Assistant Examiner—E. H. To
Attorney, Agent, or Firm—Louis Weinstein

[57] ABSTRACT

A linear motor is movable along a substantially flat stator. Electrical, mechanical and pneumatic drive sources are coupled to the linear motor through an umbilical cord. A strain relief member, normally linked to the linear motor, is towed by the linear motor to the desired position along the platen. The strain relief member is then decoupled from the linear motor, and is magnetically (or vacuum) attracted and temporarily "locked" to the platen. A portion of the umbilical cord is clamped to the strain relief member at a point intermediate the ends thereof. The length of umbilical cord between the clamp and the linear motor hangs loosely to provide sufficient "play" between the strain relief member and the linear motor. The strain relief member, being "locked" to the platen isolates any pulling or pushing forces of the umbilical cord from being exerted upon the linear motor thereby enabling the linear motor to retain its precise position. The strain relief member is reconnected to the linear motor after the linear motor completes its function at the desired location and thereafter is towed to the next position by the linear motor.

31 Claims, 6 Drawing Sheets

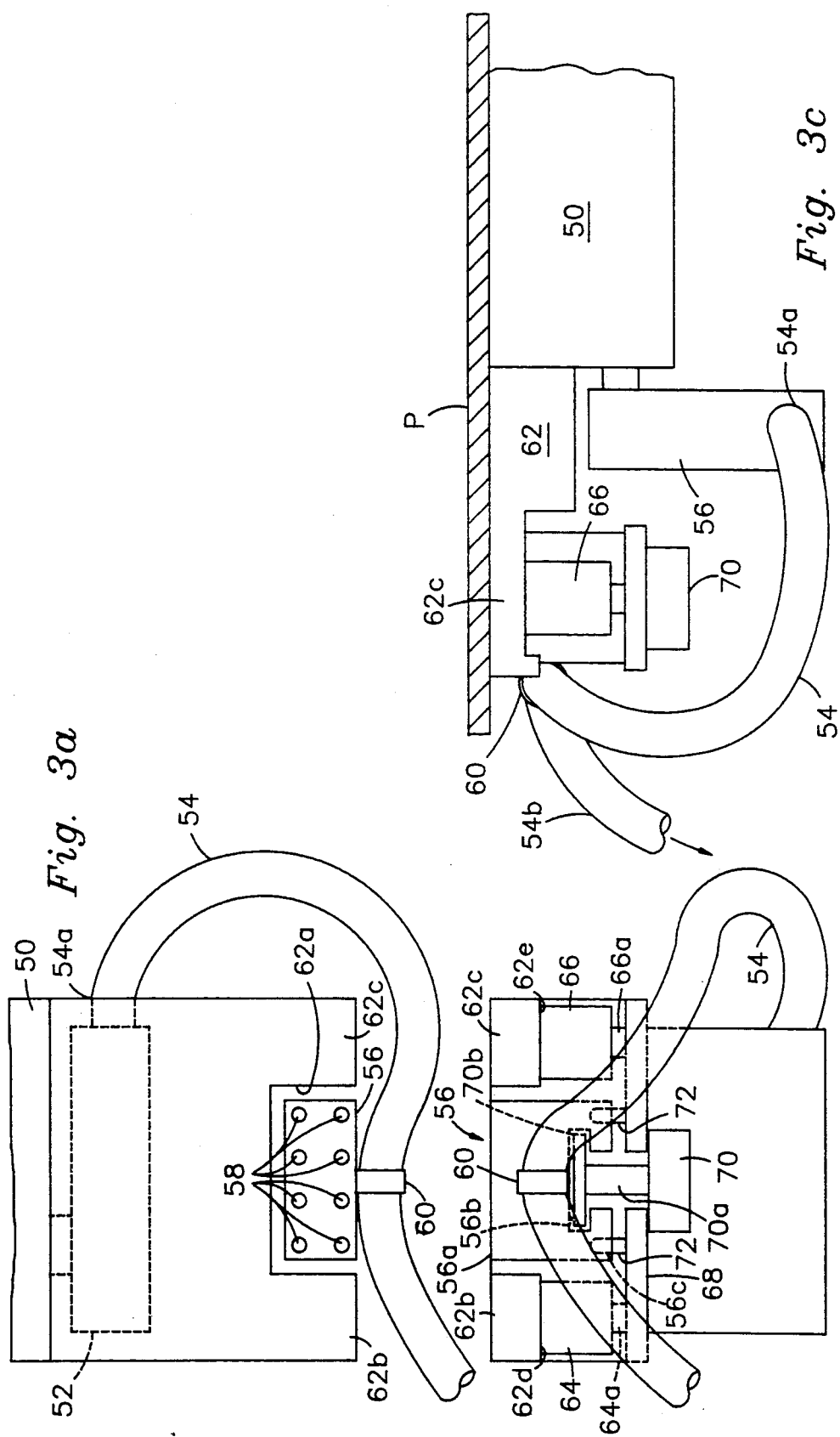

UMBILICAL RELEASE MECHANISM

FIELD OF THE INVENTION

The present invention relates to linear motor systems and more particularly to a novel method and apparatus for isolating the pulling force of an umbilical cord upon a linear motor, thereby assuring accurate positioning of the linear motor.

BACKGROUND OF THE INVENTION

Linear motors find widespread use for a variety of different applications. For example, in robotic systems, linear motors are utilized to accurately position components and/or tools or other like implements, at a precise predetermined location upon a workspace. An example of such linear motor systems is set forth in U.S. Pat. No. 4,867,595 which discloses a robotic system comprised of one or more two-dimensional or X/Y linear motors, wherein, in one particular example, each linear motor is capable of picking up a component from a part feeder, carrying the part from the part feeder to a predetermined location, whereby the linear motor is accurately positioned over a location upon the workspace, and thereafter depositing the carried part upon the workpiece. The positioning accuracy of the linear motor is extremely important in order that the linear motor be accurately positioned prior to placement of the component upon the workpiece.

The linear motor disclosed in the above-identified U.S. Pat. No. 4,867,595 moves along the surface of a stator, also known as a platen, and which is typically suspended in spaced parallel fashion above the work surface of a workspace with the working surface of the platen facing downwardly. The linear motor (or motors) are positioned against the platen working surface and are normally magnetically attracted thereto. Changing magnetic fields are created by forcers provided within the movable linear motor which react with the grooved pattern in the fixed ferromagnetic working surface of the linear motor to propel the linear motor selective predetermined distances in mutually perpendicular directions over the two-dimensional workspace. A work surface is positioned a spaced substantially parallel distance below the working surface of the platen for supporting workpieces such as, for example, printed wiring boards, component receptacles and the like. Appropriate electrical and/or mechanical and/or pneumatic signals, are typically coupled to the linear motor through an umbilical cord, enabling the linear motor to perform one or a variety of functions such as component or article pick-up, placement and release, operation of a tool to act upon the workpiece and examination of the workpiece, to name just a few possible operations.

The umbilical cord may, for example, be a bundle of sleeves or conduits for conveying electrical, mechanical and pneumatic energy to the linear motor, which sleeves or conduits are arranged in a tight bundle. Alternatively, the tight bundle of conduits may be covered with a suitable covering sleeve or sheath. The first end of the umbilical cord is coupled to the sources providing the desired energy to be delivered to the linear motor arranged just beyond the workspace and the second end of the umbilical cord is coupled to an interface or connector provided upon the linear motor structure for coupling each form of energy to a desired utilization device. The linear motor is moved by signals applied through the umbilical cord to a particular X/Y location along the working surface of the stator whereupon the part or article carried by the linear motor is placed upon the work surface. Alternatively, a function such as part placement, measuring, observing, rotating a screw, soldering a joint, or the like may also be performed after appropriate X/Y positioning of the linear motor.

The umbilical cord has been found to exert a pulling force upon the linear motor which has been found to be as much as several pounds. Although this pulling force is relatively small, the pulling force nevertheless has a significant influence upon the linear motor, tending to pull the linear motor away from the highly precise position to which it has been driven. It thus becomes extremely important to prevent the umbilical cord from disadvantageously and undesirably moving the linear motor from the precise position to which it has been driven preparatory to performing a function on the work surface, said umbilical cord pulling force thereby undesirably causing a misalignment between the tool or holding device arranged upon and carried with the linear motor and the location to which that tool or holding device is intended to be aligned with.

It is thus extremely important to provide means for isolating the pulling force of the umbilical cord from the linear motor to prevent misalignment of the linear motor.

BACKGROUND OF THE INVENTION

The present invention is characterized by comprising a linear motor design which utilizes a strain relief device to isolate the linear motor from the pulling force of the umbilical cord. The linear motor, as was described hereinabove, is coupled to mechanical, pneumatic and/or electrical sources by way of the umbilical cord.

A suitable clamp provided on the strain relief device secures the umbilical cord to the strain relief device at a point a spaced distance from the end of the umbilical cord coupled to the interface plug provided on the linear motor, with a sufficient length of the umbilical cord extending between the clamp and the end connected to the plug interface to provide sufficient "play" in the umbilical cord so that the interface does not apply any pulling force to the clamp by way of the umbilical cord or vice versa.

In operation, the linear motor is operated to the desired precise position along the working surface of the platen. The strain relief device is normally coupled to the linear motor and is "towed" by the linear motor toward the desired location. When the linear motor is precisely positioned at the desired location, the strain relief device, which is normally coupled to the linear motor and is "towed" by the linear motor is then decoupled from the linear motor. The strain relief device, in one preferred embodiment, is preferably provided with at least one permanent magnet member which is magnetically attracted to the platen ferromagnetic working surface. The strain relief device is thus effectively completely decoupled from the linear motor and is "locked" to the stator. Any force exerted by the umbilical cord, for example, due to its own weight and/or due to the umbilical cord being stretched, is applied only to the strain relief device, thus freeing and isolating the linear motor from any forces due to the umbilical cord which might tend to move the linear motor away from its desired position. As an example, the linear motor typically exerts a force of the order of fifty pounds upon the platen. The force exerted upon the linear motor by the umbilical cord can be as much as several pounds. Nevertheless, this small force is sufficient to disturb the linear motor and pull it away from its desired position especially in light of the fact that the linear motors employed in robotic systems have the capability of obtaining a desired position within a tolerance of one thousandth of an inch or less and the small force the umbilical cord would otherwise apply to the linear motor can have a harmful effect upon the accurate positioning of the linear motor.

In one preferred embodiment, the strain relief device is preferably comprised of a block slidably mounted within an opening in the linear motor and provided with one or more magnets responsive to positioning movement of the linear motor to the desired position, so that, when the strain relief device is moved sufficiently close to the working surface of the platen the permanent magnet secures itself to the ferromagnetic working surface of the platen with the result that any force exerted upon the strain relief device by the umbilical cord is totally isolated from the linear motor and is thus prevented from altering the position of the linear motor.

The linear motor assembly, in one preferred embodiment, is provided with locating means, preferably in the form of pins extending from a movable plate and being receivable within openings of a conforming shape provided in the strain relief device, the plate being moved away from the strain relief device and the working surface of the platen to free the strain relief device from the linear motor assembly once the linear motor is accurately positioned. After the linear motor has performed the desired operation or function, the locating members are reinserted into the cooperating openings within the strain relief device and the strain relief device is then moved away from the platen working surface to enable the strain relief device to again be towed by the linear motor to the next location whereupon the aforementioned operation is repeated. The pins further ensure that the strain relief device always mates with respect to the linear motor in a known position. Release of the pins thus ensures freedom of motion due to any positioning error caused by the umbilical cord.

In another preferred embodiment, the permanent magnets employed in the strain relief device to "lock" the strain relief device to the stator may be replaced by suction means.

OBJECTS OF THE INVENTION

It is, therefore, one object of the present invention to provide a method and apparatus for preventing the umbilical cord of a linear motor from exerting any undesirable pulling forces upon the linear motor.

Still another object of the present invention is to provide a strain relief device for use in conjunction with a linear motor having an umbilical cord wherein the strain relief device is caused to be selectively attracted to the stator so that the umbilical cord, which is clamped to the strain relief device, is prevented from exerting undesirable pulling forces upon the linear motor.

Still another object of the present invention is to provide a novel method for operating a linear motor having a strain relief device normally coupled thereto wherein the umbilical cord, which is utilized to couple power sources to the linear motor, is clamped to the strain relief device, the method comprising the steps of: normally coupling the strain relief device to the linear motor and moving the linear motor toward a desired precise location whereby the strain relief device is towed by the linear motor; releasing the strain relief device from the linear motor and moving the strain relief device toward the ferromagnetic stator so that a permanent magnet member forming part of the strain relief device is magnetically attracted and locked to the ferromagnetic stator; operating the linear motor to perform a function at the desired location; moving the strain relief device away from the ferromagnetic stator upon completion of the linear motor function; and recoupling the strain relief device to the linear motor.

The above, as well as other objects of the present invention will become apparent when reading the accompanying description and drawings in which:

BRIEF DESCRIPTION OF THE FIGURES

FIGS. 3a, 3b and 3c show top plan, and side and end elevational views respectively of another preferred embodiment of the present invention.

DETAILED DESCRIPTION OF THE INVENTION AND PREFERRED EMBODIMENTS THEREOF

Figure 1:
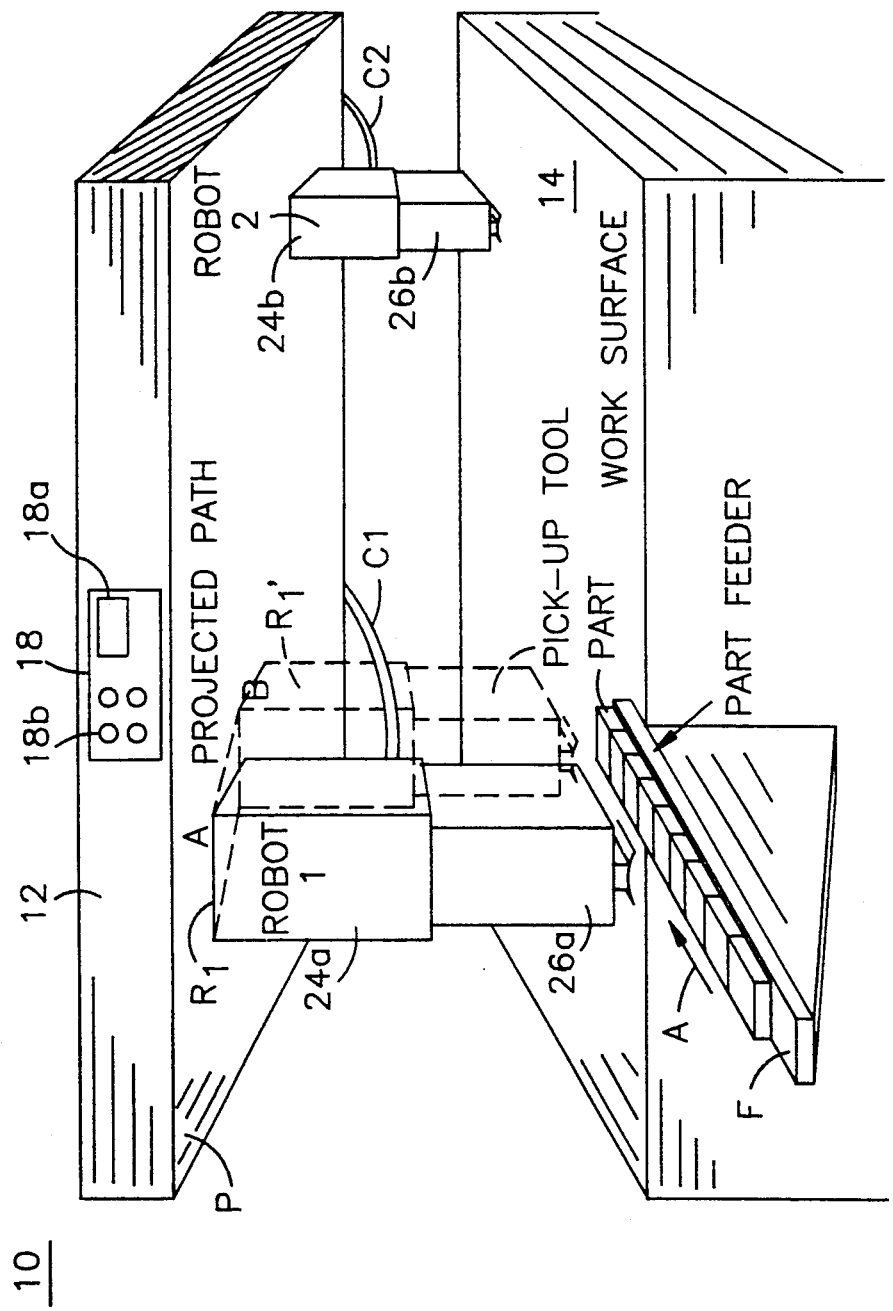
FIG. 1 shows a simplified schematic view of a robot system which the technique of the present invention may be used to great advantage.

FIG. 1 shows a robotic system which may use the invention to be described in detail hereinbelow to great advantage, said robotic system 10 being comprised of a housing 12 supported above a work surface 14 by a suitable support frame (not shown for purposes of simplicity). Housing 12 preferably contains all of the system electronics and, being positioned above the work surface 14, saves valuable floor space. Housing 12 is preferably provided with a control panel 18 which may include a touch screen display 18a as well as other control members arranged in array 18b to facilitate operator interaction with the robotics system.

The system example shown utilizes first and second robots 24a and 24b each having manipulator arms 26a, 26b. Each robot is comprised of a two-dimensional linear motor preferably utilizing air bearings for high speed accuracy and reliability and for moving the robots in the X/Y direction. Each robot is provided with additional drive means (not shown) for moving the end effector 26a, 26b in the Z direction (vertical direction) as well as providing for pick and release operations, for example. The system 10 and its supporting frame are designed to fit over existing conveyors, thus reducing floor space requirements while providing easy access to the products being worked on.

The linear motors of robots 24a and 24b are movable along the undersurface of platen P which enables the robots to engage in substantially totally free movement in the X and Y directions limited only by the surface extent of platen P and the portion of the total area occupied by other robot(s) or obstacles.

A parts feeder F conveys the parts positioned thereon to a take-off location, the parts being moved in the direction shown by arrow A to place each part in the take-off position.

A robot device is comprised of a robot linear motor 24, an end effector 26 or manipulator, as well as male/female connectors appropriate for gripping the part to be placed on the assembly site and/or further being appropriate for performing an operation on the work surface or on a part, such as, for example, heating, providing air pressure for a particular function such as, rotating a screw, air cleaning, or the like.

All of the power for operating the robots is coupled to the robots from power sources, preferably provided in housing 12, through umbilical cords C1 and C2, as shown. The umbilical cords may comprise a plurality of cables, conduits or sleeves containing insulated electrical wires, pneumatic conduits, mechanical drives (such as plungers) and the like. Each robot is moved from a quiescent position such as, for example, the position R1 shown in FIG. 1, to a pick-up position R1' in order that the end effector or pick-up tool 26a be appropriately positioned to pick up a part from part feeder F, for example. Such motion initially comprises: movement in the X/Y plane to the pick-up location; movement in the downward vertical (−Z) direction; gripping of the part by manipulators (not shown) which may either be a pair of holders squeezed together or a vacuum operated holding implement; a lifting operation, i.e. movement in the upward vertical (+Z) direction; movement in the X/Y direction to the assembly site; lowering of the manipulator to the assembly site, i.e. movement in the downward vertical (−Z) direction; and placement of the part thereon.

X/Y movement of the type described is accomplished by means of the linear motor in cooperation with the platen P which is preferably formed of a suitable ferromagnetic material and is provided with a grid of substantially square-shaped teeth arranged in mutually perpendicular rows and columns and cooperating with the electromagnetic fields generated by the linear motor in robot 24a to provide movement of the robot to a precise location along platen P. One suitable platen and cooperating linear motor is described in U.S. Pat. No. 4,823,062 issued Apr. 18, 1989 and assigned to the assignee of the present invention and further detailed description thereof will be omitted herein for purposes of simplicity, the description of U.S. Pat. No. 4,823,062 being incorporated herein by reference thereto.

As was described hereinabove, the umbilical cord C exerts a force upon its associated robot which is highly disadvantageous due to the fact that this force has been found to move the linear motor away from the precise position to which it has been driven resulting in misalignment between the robot manipulator and that component or location upon the work surface which is to be manipulated or which is to receive a component, for example.

Figure 2A:
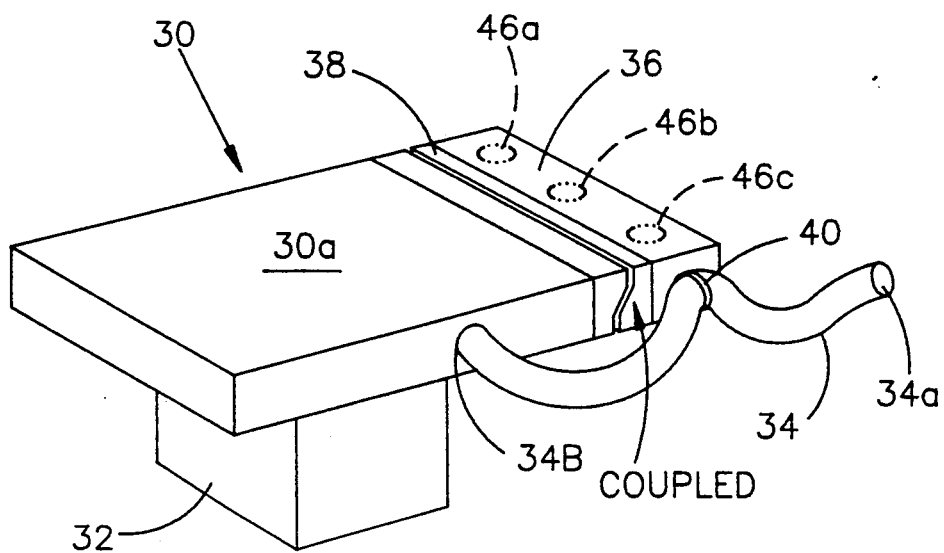
FIGS. 2a and 2b are perspective views showing a linear motor designed in accordance with the principles of the present invention and utilizing a strain relief device wherein the strain relief device is respectively shown in the coupled and uncoupled states.
Figure 2B:
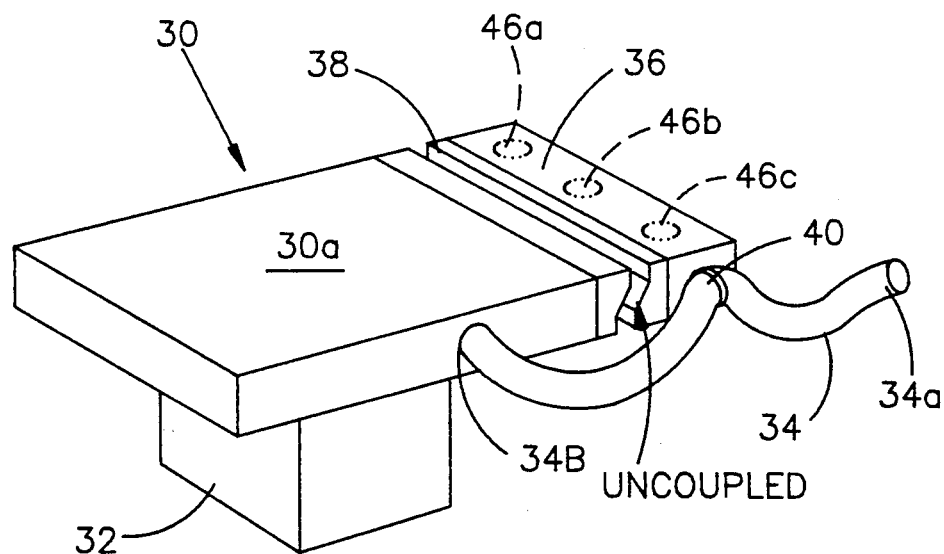

In order to prevent the umbilical cord from causing misalignment of the linear motor, the present invention contemplates the use of a strain relief device which is shown, for example, in the embodiment of FIGS. 2a and 2b. FIGS. 2a and 2b show a robot linear motor 30 whose upper surface 30a is positioned immediately adjacent the surface of platen P as shown in FIG. 1. Suitable means (not shown for purposes of simplicity) provide a film of air between surface 30a and the confronting surface of platen P to provide an "air bearing". The movable linear motor generates changing electromagnetic fields in both the X and Y directions, which fields interact with the grid-like pattern of teeth formed in the working surface of platen 30, as is described in detail in U.S. Pat. No. 4,823,062, in order to move the linear motor selected predetermined distances in mutually perpendicular directions along platen P.

The linear motor is provided with a suitable manipulator 32 for performing a desired function upon the workspace arranged therebeneath as shown in FIG. 1. Power necessary for powering the linear motor and the manipulator, for example, is coupled to the linear motor through umbilical cord 34 whose right-hand end 34a is coupled to the desired power sources (not shown for purposes of simplicity) and whose left-hand end extends into the linear motor housing for coupling to appropriate utilization devices contained therein.

A strain relief device 36 is selectively coupled to linear motor 30 through coupling means 38 which, in FIG. 2a is in the coupled position and in FIG. 2b is in the uncoupled position.

The strain relief device 36 is provided with clamping means 40 which clamps a portion of umbilical cord 34 to the strain relief device. The portion of the umbilical cord between clamp 40 and left-hand end 34b is of a length sufficient to allow the umbilical cord to hang somewhat loosely therebetween, as shown in the Figures, in order to provide some play between the strain relief device 36 and the linear motor 30 sufficient to isolate any pulling forces of the umbilical cord 34 from being exerted upon the linear motor 30 by allowing sufficient play between the strain relief device 36 and linear motor 30 due to the slack in the portion of the umbilical cord extending between clamping means 40 and the end 34b.

Figure 2C:
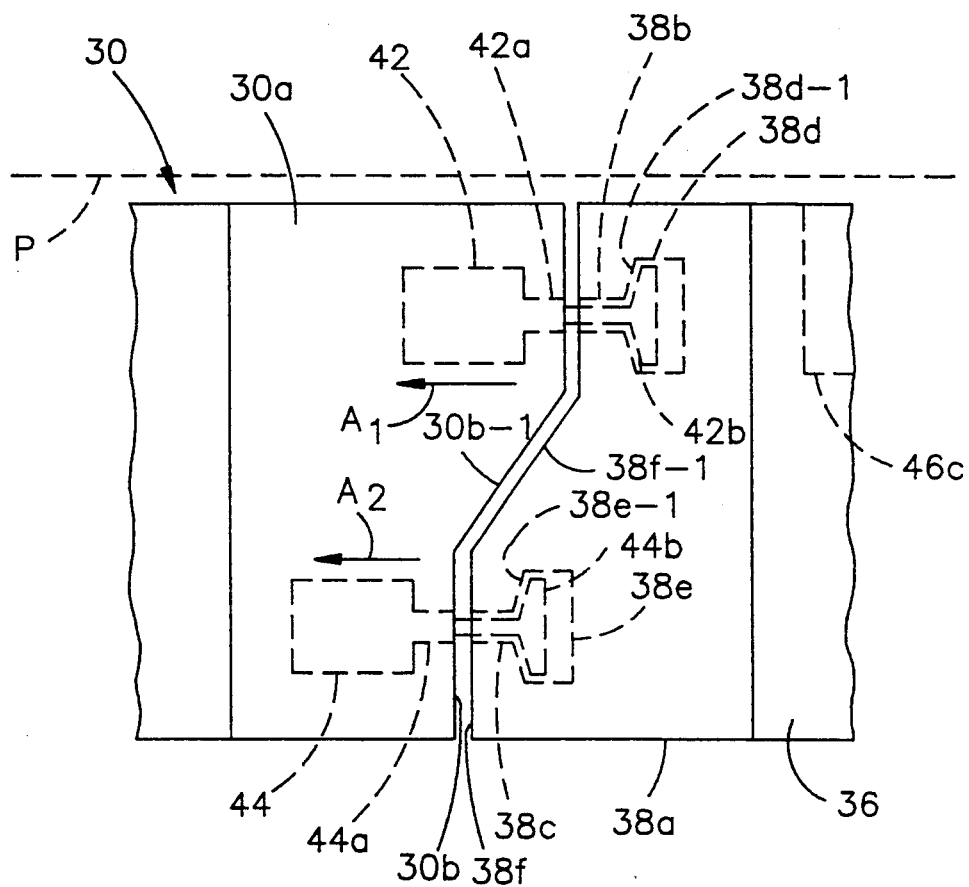
FIGS. 2c and 2d respectively show enlarged views of the coupling assembly in the coupled and uncoupled states.

One coupling means embodiment is shown in detail in FIG. 2c and is comprised of a pair of cylinders 42, 44 arranged within the linear motor 30 and having piston rods 42a, 44a extending through openings in housing portion 30a and into enlarged openings 38b, 38c within coupling housing 38a. The piston rods terminate in enlarged tapered heads 42b, 44b which are arranged within chambers 38d, 38e within housing 38a. Chambers 38d, 38e are of generally the same configuration as the enlarged tapered heads 42b, 44b but are of greater size, as can be seen.

When in the coupled position, as shown in FIG. 2c, cylinders 42, 44 are operated to draw the heads 42b, 44b toward the left as shown by arrows A1, A2. The enlarged tapered heads 42b, 44b engage the left-hand tapered walls 38d-1, 38e-1 of chambers 38d, 38e urging the strain relief device 36 against the linear motor 30, maintaining the external engaging walls 30b and 38f into alignment as shown in FIG. 2c.

Figure 2D:
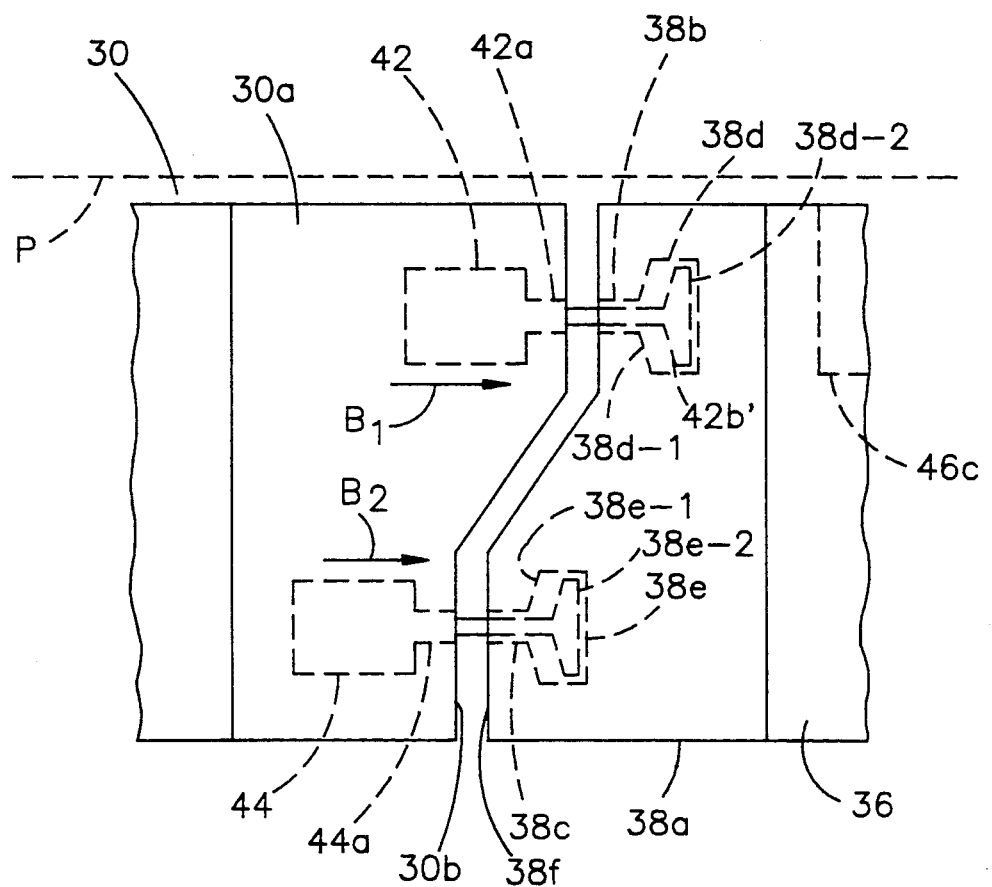

The decoupled position is obtained by operating cylinders 42, 44 to move the heads 42b, 44b to the right as shown by arrows B1 and B2 in FIG. 2d thereby urging heads 42b, 44b against the right-hand side walls 38d-2, 38e-2 respectively, thereby moving the housing portions 30a and 38a apart. Housing portion 38a and strain relief device 36 in addition to moving away from linear motor 30, is further caused to move upwardly to occupy the position shown in FIG. 2d, strain relief device 36 being magnetically attracted to and thereby locked to the platen P under the influence of the permanent magnets 46a, 46b, 46c (FIGS. 2a, 2b), only one of which is shown in FIGS. 2c and 2d. As can be seen, the piston rods 42a, 44a move closer to the lower ends of openings 38b, 38c. Similarly, head portions 42b, 44b move toward the bottom end of chambers 38d, 38e. In the decoupled position, the pulling (or pushing) force of the umbilical cord 34 is exerted only upon the strain relief device 36 due to the amount of play between strain relief device 36 and linear motor 30. The play between chambers 38d, 38e and the piston rod heads 42b, 44b also assure effective decoupling between the linear motor 30 and the strain relief device 36. The precise positioning of the linear motor is thus maintained throughout the time interval during which the strain relief device is locked to the platen P.

When the function performed at the desired location is completed, cylinders 42 and 44 are operated to urge their heads toward the left as shown in FIG. 2c. When these heads are urged against tapered left-hand walls 38d-1, 38e-1 of chambers 38d, 38e, the strain relief device is caused to move downwardly and to the left and is pulled away from platen P due to the diagonally aligned cooperating surface portions 30b-1 and 38f-1 of the cooperating external surfaces 30b, 38f. The strain relief device is now in the coupled position in readiness to be towed by the linear motor to the next location.

Since positioning accuracy is of the order of 0.001 inches, even a small influence upon the linear motor car disturb the desired alignment. The strain relief device of the present invention accomplishes the objective of preventing misalignment cf the linear motor due to the umbilical cord 34.

FIGS. 3a, 3b, and 3c show still another embodiment of the present invention comprising a linear motor 50 having a single plug interface 52. Umbilical cord 54 has its right-hand end 54a coupled to single plug interface 52, as shown in FIG. 3. The left-hand end 54b is coupled to the various power sources (not shown) utilized to operate the linear motor and the strain relief device. Interface 52 distributes the power sources to all of the devices of the linear motor to be operated by such power sources. The linear motor rides along the undersurface of platen P and preferably emits air under pressure to provide a cushion or thin film of air between the upper surface of linear motor 50 and the undersurface of platen P.

The strain relief device comprises a block 56 having a plurality of permanent magnets 58 embedded therein, the permanent magnets being arranged near the top surface 56a of strain relief device 56.

A wire clamp 60 secured to block 56 clamps a portion of umbilical cord 54 against strain relief device 56. The length of the umbilical cord between clamp 60 and end 54a is sufficient to allow that portion of the umbilical cord to hang loose or slack and thereby provide sufficient play between linear motor 50 and strain relief device 56 to isolate any pulling forces of the umbilical cord from the linear motor, as will be more fully described.

The linear motor also includes a holding block 62 which is provided with a slot 62a in which strain relief device 56 is slidably mounted. Mounting block 62 is further provided with projections 62b, 62c having downwardly facing surfaces 62d, 62e for supporting a pair of air cylinders 64, 66. The air cylinders are rigidly secured to projections 62b, 62c and have their piston rods 64a, 66a secured to an elongated support plate 68 having an air cylinder 70 secured thereto and along the underside of plate 68. The piston rod 70a of air cylinder 70 and enlarged head 70b extend into a substantially T-shaped opening 56b within strain relief device 56, which opening is substantially greater in size than the piston rod 70a and enlarged head 70b to provide sufficient play therebetween to effectively decouple block 56 from linear motor 50. The upper surface of plate 68 is provided with a plurality of upwardly directed positioning pins 72 which have tapered free ends and which extend into openings 56c provided within the body of strain relief device 56 and having a shape conforming to the shape of the pins 72 received therein.

The manner in which the linear motor and strain relief device of FIGS. 3a, 3b and 3c operates is as follows:

FIGS. 3a, 3b and 3c show the position of the strain relief device when coupled to the linear motor.

Assuming that the linear motor is directed to carry out a particular function, signals are provided to move the linear motor to the desired location along the platen P. The linear motor moves to the desired position, towing the strain relief device. As soon as the linear motor arrives at the desired position, air cylinder 70 is operated to urge its piston 70a upward thereby urging strain relief device 56 upward. Strain relief device 56 is moved upwardly through a distance sufficient to cause the permanent magnet members 58 to be magnetically attracted to the ferromagnetic platen P and thereby become locked to the platen. Thereafter, cylinders 64 and 66 are simultaneously operated to drive mounting plate 68 downwardly to move pins 72 out of the cooperating openings 56c within the body of strain relief device 56 thereby decoupling strain relief device 56 from the linear motor 50. At this time, any pulling or pushing force exerted upon and/or developed by the umbilical cord 54 is completely isolated from linear motor 50 since such pulling force will be exerted only upon strain relief device 56 while linear motor 50 is isolated from this pulling force due to the amount of play between the linear motor and the strain relief device as a result of the preselected length of the umbilical cord 54 extending between clamp 60 and single plug interface 52 and the play between block 56 and piston rod 70a. The length of the umbilical cord to provide suitable slack is not critical. The length should preferably not be too great in order to minimize the weight of the slack portion of the umbilical cord between clamp 60 and interface 52.

Upon completion of the operation performed by the linear motor at the desired location, cylinders 64 and 66 are operated to move mounting plate 68 upwardly to cause reentry of pins 72 into associated opening 56c. Thereafter, cylinder 70 is operated to draw strain relief device 56 downwardly and away from ferromagnetic platen P, the force exerted upon strain relief device 56 by the piston rod of cylinder 70 being sufficient to overcome the magnetic pulling force of the permanent magnets 58 upon the ferromagnetic platen P and to hold block 56 against plate 68. The strain relief device is thus maintained in the coupled state and may again be towed to the next location preparatory to performance of a robotic function once the linear motor is accurately positioned. The pins 72 and cooperating openings 56c assure proper alignment between block 56 and the linear motor when the block is mated thereto.

It can thus be seen that the present invention provides a novel method and apparatus for accurately positioning linear motors and the like and for enabling the linear motors to maintain their accurate position free from any pulling forces which may be exerted upon the linear motor by the umbilical cord utilized to couple power thereto.

Figure 4:
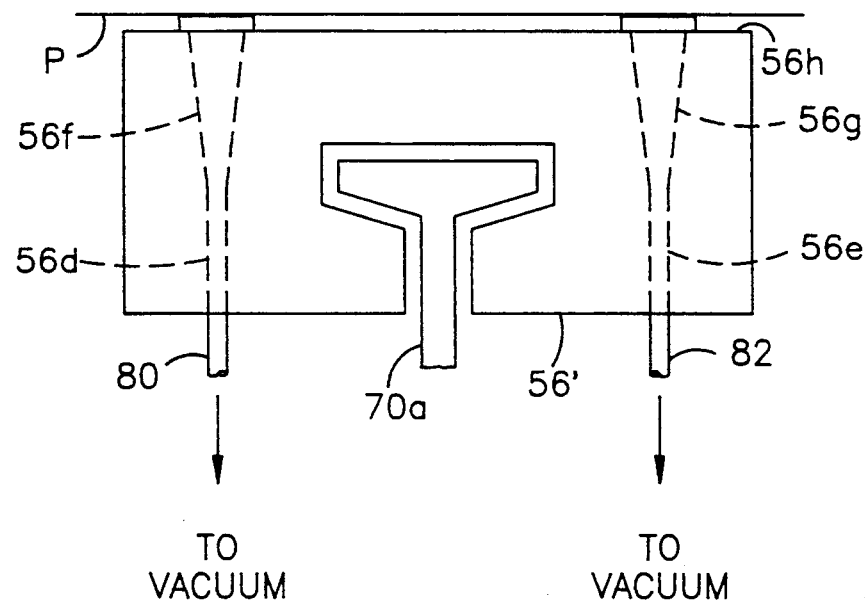
FIG. 4 is an elevational view of another embodiment of the present invention.

A latitude of modification, change and substitution is intended in the foregoing disclosure, and in some instances, some features of the invention will be employed without a corresponding use of other features. Accordingly, it is appropriate that the appended claims be construed broadly and in a manner consistent with the spirit and scope of the invention herein described. For example, the permanent magnets provided in the strain relief devices of FIGS. 2 and 3 may be replaced by electromagnets or vacuum means which are maintained energized only during the time that the strain relief device is attracted to the platen. Noting FIG. 4, the block 56' is provided with openings 56d, 56e coupled to conduits 80, 82 at their lower ends and communicating with tapered portions 56f, 56g which terminate at openings in the upper surface 56h in block 56'. The openings in surface 56h are surrounded by annular, resilient, compressible members such as O-rings which provide an air-tight seal between the surface of platen P and the O-ring to "lock" block 56' to the platen when a vacuum source (not shown) is coupled to the openings 56d, 56e by umbilical cord 54, interface 52 and conduits 80, 82.

What is claimed is:

1. A linear motor system comprising:
   a stator having a substantially planar working surface formed of a magnetically attractive material;
   a linear motor assembly movable along said working surface and including at least one linear motor for generating a magnetic field which interacts with said stator for moving said linear motor assembly relative to said stator to a predetermined location along the stator;
   elongated umbilical cord means extending between a power source and said linear motor for coupling power to said linear motor;
   strain relief means;
   means for clamping said umbilical cord means to said strain relief means at a location intermediate the ends of said umbilical cord means;
   said strain relief means including means for attracting said strain relief means to said working surface; and
   means for releasably coupling said strain relief means to said linear motor assembly,
   whereby said means for attracting holds said strain relief means to said stator when said strain relief means is decoupled from said linear motor assembly to substantially isolate any pulling force of the umbilical cord means from said linear motor assembly.

2. The system of claim 1 wherein a portion of the umbilical cord means extending between said clamping means and the linear motor is of a length sufficient to provide sufficient play between said linear motor assembly and said strain relief means to prevent the said portion of said umbilical cord means from being tautly drawn between said strain relief means and said linear motor when said strain relief means is decoupled rom said linear motor.

3. The linear motor system of claim 1 wherein said umbilical cord means includes electrical cable means.

4. The linear motor system of claim 1 wherein said umbilical cord means includes electrical cable means and conduit means for conveying pneumatic power to the linear motor.

5. The linear motor system of claim 1 wherein said umbilical cord means includes electrical cable means and conduit means for conveying pneumatic power to the linear motor and mechanical conduit means for conveying mechanical energy to said linear motor assembly.

6. A linear motor system according to claim 1 wherein the working surface of said stator faces downwardly;
   a work surface for receiving work pieces arranged a spaced distance beneath said working surface;
   said linear motor assembly being magnetically attracted to said working surface and suspending downwardly therefrom and toward said work surface.

7. The linear motor system of claim 6 further comprising means arranged on said linear motor assembly for releasably carrying a work piece to be accurately placed upon the work surface.

8. The linear motor system of claim 1 wherein said linear motor assembly further comprises a platform supporting said linear motor;
   said platform having an opening;
   said strain relief means being slidably movable within said opening between a first position displaced from said stator and a second position sufficiently close to said stator to become secured thereto by magnetic attraction; and
   said means for releasably coupling said strain relief means being mounted on said platform and normally maintaining said strain relief means in said first position for moving said strain relief means to said second position.

9. The linear motor system of claim 8 wherein said strain relief means is provided with positioning openings;
   pin means on said platform movable between an engaging position engaging said positioning openings and a displaced position displaced from said openings; and
   said means for releasably coupling further comprises moving means normally maintaining said pin means in said first position for selectively moving said pin means to said second position.

10. The linear motor system of claim 9 wherein said pin means comprises a mounting plate having a plurality of pins arranged thereon;
    said moving means further comprising cylinder means mounted between said platform means and said mounting plate for moving said mounting plate respectively toward and away from said strain relief means when moving said pin means between said engaging and displaced positions.

11. The linear motor system of claim 8 wherein the opening receiving said strain relief means is larger than the strain relief means to provide sufficient play between said strain relief means and said linear motor assembly to permit said strain relief means to isolate a force exerted by said umbilical cord means from said linear motor assembly.

12. The linear motor system of claim 10 wherein said pins are tapered pins having their wider ends secured to said plate, the shape of said pin receiving openings conforming to said tapered pins.

13. The linear motor system of claim 8 wherein said moving means for releasably coupling said strain relief means further comprises cylinder means for moving said pins between said engaging and displaced positions.

14. The linear motor system of claim 9 wherein said moving means comprises a pair of cylinder means for moving said pins between said engaging and displayed positions.

15. The linear motor system of claim 13 wherein said cylinder means further comprises a piston rod having a substantially T-shaped free end;
    said strain relief means having an opening for receiving said T-shaped free end and substantially conforming to said T-shaped free end;
    said opening receiving said T-shaped free end being larger than said T-shaped free end to permit said strain relief means to experience sufficient play relative to said piston rod to isolate said linear motor assembly from any force due to said umbilical cord means.

16. The linear motor system of claim 15 wherein said T-shaped free end has a tapered conical-shaped surface;
    said opening having a conforming tapering surface cooperating with the tapered surface of said T-shaped free end.

17. The linear motor system of claim 1 wherein said means for attracting comprises magnetic means.

18. The linear motor system of claim 17 wherein said magnetic means comprises at least one permanent magnet.

19. The linear motor system of claim 17 wherein said magnetic means comprises at least one electromagnet.

20. The linear motor system of claim 1 wherein said means for attracting comprises vacuum means for holding said strain relief means against said working surface.

21. The linear motor system of claim 20 wherein said vacuum means includes a vacuum source coupled to an opening in said strain relief means facing said working surface through a conduit forming part of said umbilical cord.

22. The linear motor system of claim 21 further comprising resilient, compressible means surrounding the marginal portion of said opening to enhance the vacuum attraction of said strain relief means to said working surface.

23. The linear motor system of claim 22 wherein said resilient, compressible means comprises an O-ring.

24. A method for operating a linear motor system comprising the steps of providing:
    a stator having a working surface;
    a linear motor movable along said working surface, at least one power source and umbilical cord means for coupling said linear motor to said power source;
    strain relief means attractable to said stator and coupling means for coupling said strain relief means to said linear motor in a first state and decoupling said strain relief means from said linear motor when in second state;
    clamping means for clamping said umbilical cord means to said strain relief means at a location along said umbilical cord means a predetermined distance from said linear motor;
    said method further comprising the steps of:
    normally maintaining said coupling means in said first state;
    applying signals to said linear motor to move said linear motor to a predetermined position along said stator, whereby said strain relief means is towed by said linear motor; and
    operating said coupling means to said second state when said linear motor reaches said predetermined position enabling said strain relief means to become attracted to said stator to isolate said linear motor from any forces due to said umbilical cord means.

25. The method of claim 24 further comprising the step of attracting the strain relief means to the working surface by drawing a vacuum through an opening in the strain relief means facing said working surface.

26. The method of claim 24 further comprising the step of attracting the strain relief means to the working surface by providing a magnetic means in said strain relief means which is attracted to said working surface.

27. The method of claim 26 wherein the magnetic means is an electromagnet and said method further comprises the step of energizing the electromagnet when the strain relief means is decoupled from the linear motor.

28. The method of claim 24 further including providing:
    a work piece supporting surface spaced from said stator;
    operating means on said linear motor for operating on said work piece supporting surface;
    said method further comprising the steps of:
    providing signals to said operating means through said umbilical cord means to perform a function upon said work piece supporting surface;
    moving said strain relief means away from said stator; and
    decoupling said strain relief means to said linear motor preparatory to moving the linear motor to another position along said stator.

29. The method of claim 24 wherein the step of operating the coupling means to said second state further comprises the step of moving said strain relief means toward said stator to enable said strain relief means to become locked to said stator due to the attraction of said strain relief means to said stator.

30. The method of claim 24 further comprising the steps of providing:
    positioning openings in said strain relief means; and
    positioning pins mounted upon a movable platform;
    said method further comprising the steps of:
    normally maintaining the positioning pins in associated positioning openings; and
    moving the positioning pins away from said positioning openings when said strain relief means is moved against said platen.

31. A drive system comprising:
    a substantially planar working surface;
    a drive assembly movable along said working surface and including at least one motor for moving said drive assembly along the planar working surface;
    elongated umbilical cord means extending between a power source and said motor for coupling power to said motor;
    strain relief means;
    means for securing said umbilical cord means to said strain relief means at a location intermediate the ends of said umbilical cord means;
    said strain relief means including means for selectively attracting said strain relief means to said working surface; and
    means for releasably coupling said strain relief means to said drive assembly, enabling said means for selectively attracting to hold said strain relief means against said working surface.

* * * * *

UNITED STATES PATENT AND TRADEMARK OFFICE
CERTIFICATE OF CORRECTION

PATENT NO. : 5,136,196
DATED : August 4, 1992
INVENTOR(S) : Thomas D. Schmidt

It is certified that error appears in the above-identified patent and that said Letters Patent is hereby corrected as shown below:

Column 4, line 20, after "system" insert --in--

Column 7, line 27, change "car" to --can--

Column 7, line 30, change "cf" to --of--

Column 9, line 59, change "rom" to --from--

Column 11, line 1, change "displayed" to --displaced--

Signed and Sealed this

Twenty-fourth Day of August, 1993

*Attest:*

BRUCE LEHMAN

*Attesting Officer*  *Commissioner of Patents and Trademarks*